Figure 1:
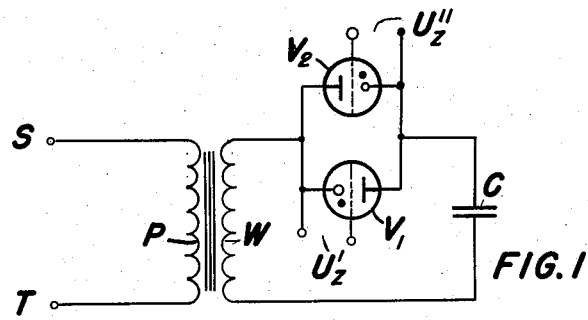

June 17, 1958 — R. WIDERÖE ET AL — 2,839,708
DOUBLE RAY BETATRON

Filed April 8, 1955 — 3 Sheets-Sheet 1

INVENTORS
Rolf Wideröe
Hans Nabholz
BY Pierce, Scheffler & Parker
ATTORNEYS

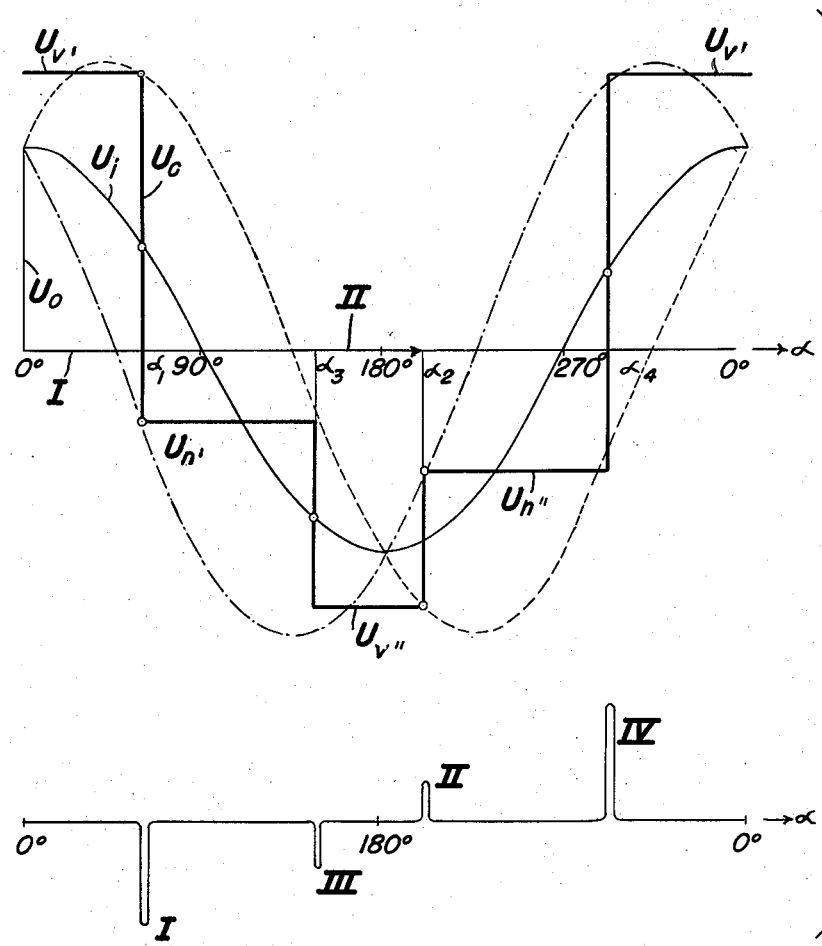

United States Patent Office 2,839,708
Patented June 17, 1958

2,839,708

DOUBLE RAY BETATRON

Rolf Wideröe, Ennetbaden, and Hans Nabholz, Baden, Switzerland, assignors to Aktiengesellschaft Brown, Boveri & Cie., Baden, Switzerland, a joint-stock company Application April 8, 1955, Serial No. 500,245

Claims priority, application Switzerland April 14, 1954

5 Claims. (Cl. 315—196)

As known, the electrons can be made useful in a betatron after their acceleration by an expansion or contraction of the equilibrium circle. To this end a special winding (expansion or contraction winding) can be used, which at least embraces a part of the accelerating magnetic field, and which, when the current circulates through it, changes the proportion of the accelerating field to the intensity of the control field which is to be maintained during the acceleration phase, and thus also changes the radius of the equilibrium circle.

It is known as an especially advantageous arrangement to produce current impulses in such a winding by which there is enlarged the equilibrium circle. Besides, the expansion winding is connected with in a series arrangement with a condenser and two thyratrons, which latter are parallely installed, one below the other, with opposing low resistance directions of current conduction. Then the thyratrons are alternatively made conductive, each time when the accelerating magnetic field reaches a maximum value; and each time at these moments there occurs current impulses (expansion impulses) in the expansion winding, when the electrons have reached their maximum speed. The particular advantage of this known arrangement is the extraordinary low cost. Above all, no extraneous source of current is necessary for the expansion impulses; rather the required energy is taken from the part of the magnetic field which is embraced by the expansion winding. The arrangement is especially suitable for so-called double ray betatrons as described in my prior United States Patent No. 2,538,718, granted January 16, 1951, in which electrons alternately accelerate in both directions of circulation around their orbit.

Moreover, there are known or suggested arrangements, which apply the same principle, as is the basis of the depicted arrangement, which, however, make it possible for the energy of the electrons of one or both rays to be changed. To this end it is necessary that the moment of the expansion impulse in relation to the phase of the alternating voltage, which feeds the betatron, be variable. At the same time, attention must be paid to the fact that the expansion impulses show the correct amplitude which, with advantage, is proportional to the desired electric energy. There are known, suggested arrangements for the simultaneous adjustment of the energy of both rays, wherein both rays show the same energy at any time, and arrangements for the regulation of the energy of the one ray, while the energy of the other ray permanently, at least approximately, maintains its maximum value.

Finally an arrangement has been suggested, by means of which expansion impulses or contraction impulses can be arbitrarily produced. In this arrangement there can be arbitrarily connected the series arrangement of condenser and thyratrons, by means of a switch, with the expansion winding or with the series arrangement of expansion winding and exciter coil of the betatron. The same measure is also applicable in the betatron according to the invention; however, for the sake of simplicity, only the production of expansion impulses will be discussed in the following pages.

The present invention relates to a double-ray betatron, which also embraces an expansion winding which is crossed by at least one part of the acceleration field and which is connected with the series arrangement of a condenser and two thyratrons which latter are parallely engaged one to another with opposing low resistance directions of conduction. Thus also the betatron according to the invention, does not require special power sources for the expansion impulses, however, contrarywise to the known, suggested arrangements. It is possible, however, to establish the energies of the both rays independently one from another in the double-ray betatron according to this invention.

The basic principle for the betatron according to the invention, is explained on the basis of Figs. 1 to 4. Fig. 1 shows an equivalent-circuit diagram of the betatron, which involves only the parts which are necessary for the explanation. The exciter coil P, which produces both the accelerating magnetic field and the control field, is fed from a phase of the alternating current via the terminals S, T. It is understood that the exciter coil, the expansion or auxiliary winding, the dual cathodes and the circuit arrangement for effecting acceleration of successive electron streams in opposite directions along the closed path will be generally as indicated in my prior aforesaid U. S. Patent No. 2,538,718. The expansion exciter coil W is magnetically coupled with the winding P. On the terminals of this winding there is located the condenser C in series connection to two thyratrons $V_1$, $V_2$. These thyratrons are installed parallelly in back-to-front relation; i. e. with opposing low resistance directions of current flow. The electrical connection between expansion winding W and condenser C is effected each time of the ignition of one of the thyratrons by means of the properly passing striking potentials $U_z'$ and $U_z''$.

Figure 2:
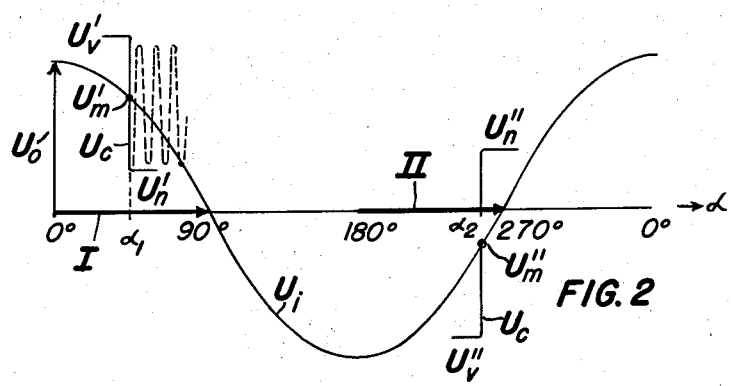
Figure 4:
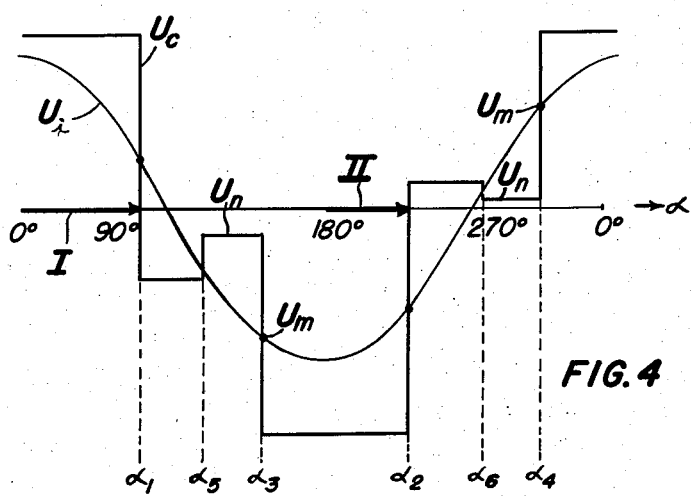

Fig. 2 shows the timely order in the proceeding of some important events. It embraces one period or cycle of the feeding A. C. current voltage. The acceleration of the electrons for the first ray begins with the phase $\alpha=0°$; its maximum duration is $\alpha=90°$ (arrow I). At this moment the electrons attain the maximum possible energy ($E_{max.}$). However, the acceleration can be interrupted at an earlier moment $\alpha_1$ by expansion of the equilibrium circle when the entire energy is not needed. The achieved energy is then $E_1=E_{max.} \cdot \sin \alpha_1$. The acceleration of the electrons for the second ray in another direction of circulation begins with $\alpha=180°$ and its maximum duration is $\alpha=270°$. It also can be stopped at any earlier moment $\alpha_2$.

Fig. 2 furthermore shows the voltage $U_1$ induced by the acceleration field in the expansion winding. It takes a course according to the functions $U_1=U_0 \cdot \cos \alpha$, where the amplitude $U_0$ is given by the arrangement of the expansion winding and its number of turns.

Finally Figure 2 shows the principle of the production of expansion impulses. It is supposed that the condenser C (Fig. 1) first is loaded for the voltage $U_c=U_{v'}$. At the moment $\alpha_1$ the thyratron $V_1$ is to be ignited. If it were conductive for both current directions, thus the condenser would be discharged via the expansion winding W in an oscillatory way, according to the damped sine oscillation represented by a dashed curve in the greatly enlarged time scale. However, in fact, the thyratron produces only one current pulse in one direction. Therefore, the oscillation is interrupted after a semicycle, as it is represented by the drawn solid curve $U_c$. As a result of the slight damping of the oscillatory circuit consisting of C, W and $V_1$, the voltage $U_c=U_{n'}$ prevailing after the ignition at the condenser, is located practically as much below the momentary terminal voltage $U_{m'}$ of the expansion winding, as the voltage $U_{v'}$ is located above it. The expansion winding causes that a current impulse circulates during the reloading of the condenser, whose magnitude was proportional to the voltage difference $U_{v'}-U_{m'}$.

An analogous discharging process is indicated at $a_2$. The condenser voltage $U_c$ possessed the value $U_{v''}$ prior to the ignition, after the ignition of the thyratron $V_2$ it is situated at $U_{n''}$, while $U_{n''}$ and $U_{v''}$ are situated again symmetrically close to the terminal voltage $U_1$, which showed the value $U_{m''}$ at the moment of the ignition.

The indicated example shows the released expansion impulse, which is larger at $a_2$ than that at $a_1$, since the voltage difference $U_{v''}-U_{m''}$ is larger than the voltage difference $U_{v'}-U_{m'}$. As known, it is advantageous if the amplitude of each expansion impulse and hence the particular voltage difference $U_v-U_i$ is proportional to the achieved electric energy, thus proportional to sin $\alpha$. Therefore, if a voltage difference $U_1$ is required for the expansion of the electrons at $\alpha=90°$ accelerated to the maximum possible energy (this value is determined by the type of construction of the expansion winding on the one hand and by the desired enlargement of the equilibrium circle on the other), thus, in general, this difference amounts to $U_v-U_1=U_1 \cdot \sin \alpha$. Since then $U_1$ takes a course according to the functions $U_0 \cdot \cos \alpha$, the necessary condenser voltage $U_{v'}$ resp. $U_{v''}$ in dependence on the expansion moments $\alpha_1$, resp. $\alpha_2$ is given by the function $$U_{v'}=U_0 \cdot \cos \alpha_1 + U_1 \cdot \sin \alpha_1$$

resp.

$$U_{v''}=U_0 \cdot \cos \alpha_2 + U_1 \cdot \sin \alpha_2$$

According to the expansions, the condenser voltage $U_c$ is given for the values $$U_{n'}=U_0 \cdot \cos \alpha_1 - U_1 \cdot \sin \alpha_1$$

resp.

$$U_{n''}=U_0 \cdot \cos \alpha_2 - U_1 \cdot \sin \alpha_2$$

According to the invention, the condenser voltage $U_{v''}$ (resp. $U_{v'}$) which is each time needed for the next expansion, is acquired from condenser voltage $U_{n'}$ (resp. $U_{n''}$) remaining from the previous expansion in such a way that the thyratron which has effected the previous expansion is once more ignited before the next expansion. The moment $\alpha_3$ (resp. $\alpha_4$) for the supplementary ignition is selected according to the invention in such a way that the condenser of the old voltage value $U_{n'}$ (resp. $U_{n''}$) is recharged just on the required new voltage value $U_{v''}$ (resp. $U_{v'}$). The recharging, therefore, must take place at that moment, at which the terminal voltage $U_i$ is situated in the middle between the old and new voltage value. For the case, which is known as advantageous, i. e. when the amplitudes of the expansion impulses are proportional to the electric energy, there is an easy computation of the phases $\alpha_3$, resp. $\alpha_4$ from the below mentioned formulae. They are given by the relations $$\cos \alpha_3 = \tfrac{1}{2} (\cos \alpha_1 + \cos \alpha_2 - K(\sin \alpha_1 - \sin \alpha_2))$$

resp.

$$\cos \alpha_4 = \tfrac{1}{2} (\cos \alpha_1 + \cos \alpha_2 + K(\sin \alpha_1 - \sin \alpha_2))$$

where $$K = U_1/U_0$$

Fig. 3 shows the interesting voltage courses in a betatron according to the invention for the cases represented herein; it embraces again a period or cycle of the feeding A. C. current voltage. For the sake of simplicity it is assumed that the impulse voltage $U_v-U_i$ required for the expansion at maximum energy equals the amplitude of the voltage induced in the expansion winding; thus $U_1=U_0$ and $K=1$. This stage can be realized if desired, by proper dimensioning of the expansion winding. Thus the voltage $U_v$ required for an expansion takes a course in dependence of the expansion phase $\alpha$ according to the function $U_0 \cdot \sqrt{2} \cdot \sin (\alpha+\pi/4)$ (dashed curve); after each expansion there is at the condenser the voltage $U_n=U_0 \cdot \sqrt{2} \cdot \cos (\alpha+\pi/4)$ (dash-dotted curve).

It is assumed by way of example, that the first ray is expanded at the phase $\alpha_1=60°$, the second ray at the phase $\alpha_2=200°$. Thus the first ray shows about 87% and the second ray about 35% of the maximum possible energy. Both thyratrons $V_1$ resp. $V_2$ will be, therefore, ignited at the phases $\alpha_1=60°$, resp. $\alpha_2=200°$. At the phase $\alpha_1$, the condenser voltage jumped from the value $U_{v'}=1.37 \cdot U_0$ to the value $U_{n'}=-0.37 \cdot U_0$; at the phase $\alpha_2$ the corresponding values are $U_{v''}=-1.28 \cdot U_0$, resp. $U_{n''}=-0.60 \cdot U_0$. According to the invention the thyratron $V_1$ is supplementarily ignited at the phase $\alpha_3=146°$. At this phase, the terminal voltage of the expansion winding is situated at $-0.825 \cdot U_0$, i. e. just in the middle between the existing value $U_{n'}=-0.37 \cdot U_0$ and the next required value $U_{v''}=-1.28 \cdot U_0$. Thus on the condenser there is available the voltage which is required for the expansion of the second ray $\alpha_2=200°$, before the beginning of the acceleration of the electrons. After this expansion, the thyratron $V_2$, is ignited in an analogous way for the second time, namely at the phase $\alpha_4=293°$, when the voltage $U_1$ with $0.385 \cdot U_0$ is situated in the middle between the voltage $U_{n''}=-0.60 \cdot U_0$, remaining from the second expansion, and the voltage $U_{v'}=1.37 \cdot U_0$ required for the next expansion. The lower part of Fig. 3 shows the positions and magnitudes of the current impulses which circulate through the expansion winding. The impulses I and II are expansion impulses, which terminate the accelerating processes beginning at $\alpha=0°$, resp. $\alpha=180°$. It is evident that the impulse magnitudes are proportional to the electric energies achieved at the expansion moments, and that the polarities of the expansion impulses alternate in accordance with the alternating direction of circulation of electrons. The impulses III and IV which originate during the recharging of the condenser to the voltage value required each time for the next expansion, do not affect any longer the functions of the betatron since there are no electrons in the equilibrium circuit at the moment of their appearance.

Thus, in recapitulation, the betatron according to the invention is characterized in that way that each thyratron is once more ignited after the expansion process allotted to it, however, before the next expansion process. This supplementary ignition is advantageously effected at least approximately at the moment, at which the voltage $U_i$ induced by the acceleration field in the expansion winding, is situated in the middle between the voltage $U_n$ reposing in the condenser from the previous expansion and the voltage $U_v$ required for the next expansion.

Naturally the always existing resistance cause that the voltage difference $U_n-U_m$ are not equal to the voltage difference $U_v-U_m$, but a little smaller than the latter. The diminishing amounts in practice to about 5–15%. The consequences of this diminishing are insignificant for the most part. If they are to be omitted, thus the phases $\alpha_3$, $\alpha_4$ of the supplementary ignition can be a little larger than the further value selected according to the above mentioned computation. It may be learned from Fig. 3 that the voltages $U_{v''}$, resp. $U_{v'}$ can be a little larger in this case, whereby the damping influence of the resistances can be compensated. Also it can be proceeded according to the further realization of the invention idea as outlined in Fig. 4. According to it, the other thyratron is ignited at the phases $\alpha_5$, resp. $\alpha_6$, between the ignition ($\alpha_1$, resp. $\alpha_2$) effecting an expansion and the supplementary ignition of a thyratron ($\alpha_3$, resp. $\alpha_4$) provided by the invention. It is evident that greater voltage differences $U_n-U_m$ are in existence at the phases $\alpha_3$, resp. $\alpha_4$ of the supplementary ignitions than in the arrangement according to Fig. 3. According to the arrangement represented by Fig. 4 an expansion impulse of any amplitude can be practically produced at any arbitrary expansion phase. Thus it is possible to depart—in special certain cases—from the general advantageous norm, according to which this amplitude is to be proportional to the achieved electric energy.

Pursuant to the first construction specimen for the betatron according to this invention, the ignition impulses are produced at the phases $a_1$, $a_2$, $a_3$, and $a_4$ (Fig. 3), by the respective phase shifter in connection with one of the circuits which are fed by the said phase shifter, and which circuits form current impulses. Such arrangements are known in many-fold construction forms. The two phase shifters for the determination of the expansion moments and thus of the desired electric energy, produce impulses, which are adjustable in the ranges $0 \leqslant a_1 \leqslant 90°$ resp. $180° \leqslant a_2 \leqslant 270°$. The phase shifter for the production of the impulses for the supplementary ignitions at the phases $90° \leqslant a_3 \leqslant 180°$ resp. $270° \leqslant a_4 \leqslant 360°$, can be regulated by hand, e. g. by means of a cathode ray oscillograph; however, its setting at the maximum of the electron exploitation is more advantageous. Thus the influences of the damping are automatically eliminated.

More convenient for the regulation are, of course, such betatrons, at which only the expansion phases $a_1$, and $a_2$ are regulated by hand to obtain the desired electric energy, while there are available special means for the automatic production of impulses for the supplementary ignitions at the proper phases $a_3$, resp. $a_4$. Each of these phases depends—as derived according to the above-mentioned inter-relations—on both expansion phases. For example, it is possible to couple the phase shifters for the production of the supplementary impulses—which are available according to the depicted first application example—together with the phase shifters for the production of the expansion impulses through a proper mechanical device. Also the phases for the supplementary ignition can be established which could automatically exploit the maximum of the electrons under application of a proper regulating arrangement, e. g. according to Swiss Patent (application 76,998).

Figure 5:
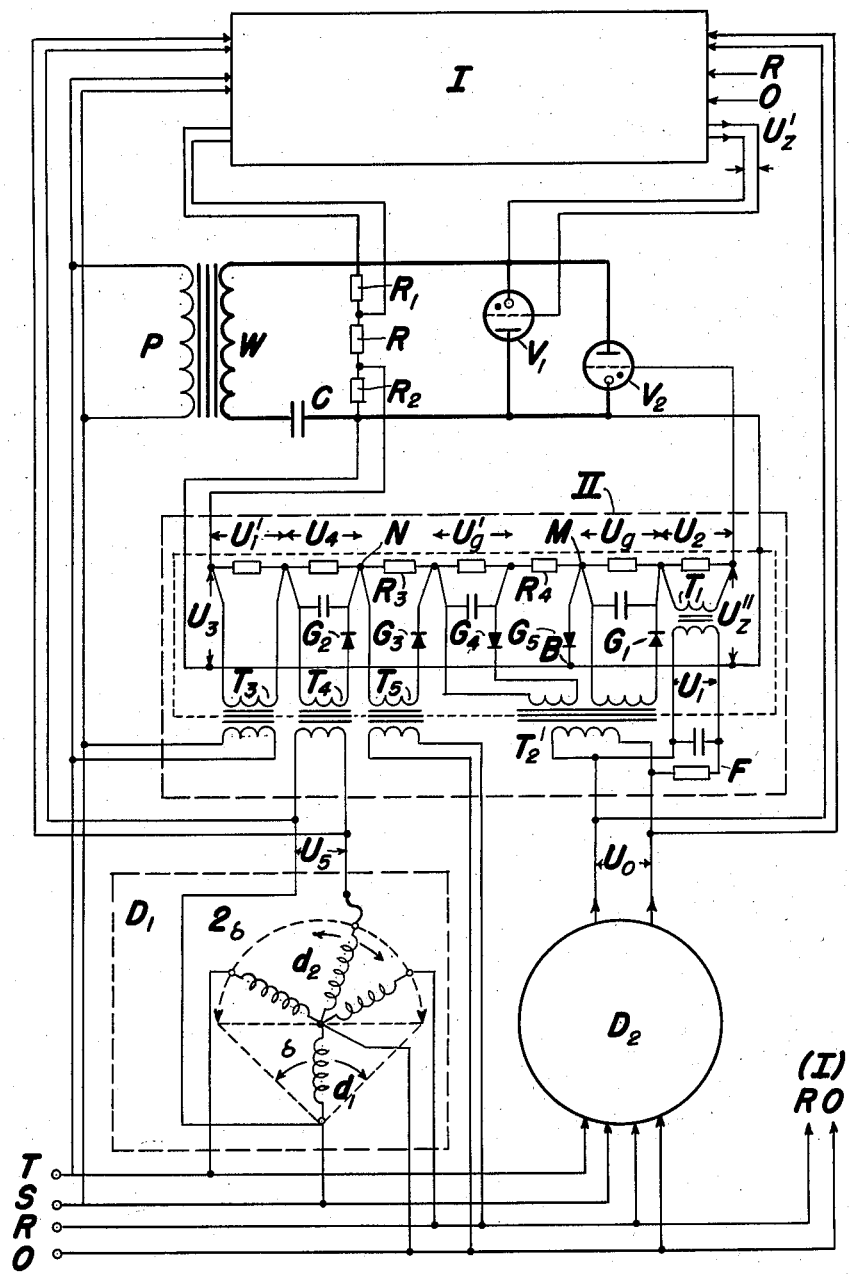

Fig. 5 shows by way of example the production of the impulses for the supplementary ignitions by means of devices operating electrically. First there are parts, represented in Fig. 1. Additionally the circuits for the production of the expansion impulses and supplementary impulses are indicated. The arrangement embraces two identical circuits of which the one which is contained in the dashed-rectangle II and is to be discussed in full, produces the ignition impulses for the thyratron $V_2$ at the phases $a_2$ and $a_4$. The other circuit which produces the ignition impulses for the thyratron $V_1$, is symbolized by the rectangle, designated with I.

In the following discussions it is assumed that each thyratron is ignited when its grid potential ascending from negative values, reaches the zero value. If this assumption for the thyratrons which are to be applied, is not realized thus a constant initial grid potential of the convenient magnitude is to be provided while the indicated arrangement is applicable in the unchanged form.

First the production of the expansion impulses at the arbitrarily regulated phase $a_2$ is discussed. In this case it is assumed that the point M of the circuit shows the same potential as the point B, which latter is connected with the cathode of the thyratron $V_2$. It will be further proved that this presumption factually exists in the interval $180° \leqslant a_2 \leqslant 270°$, which is here of great interest. In the transformer $T_1$ there is produced a series of alternating positive and negative short-time impulses from a primary voltage $U_1$ taking a course of a sine in the form of saturation events in the iron core as secondary voltage $U_2$. The primary voltage is supplied by the arbitrarily adjustable phase shifter $D_2$. Simultaneously the phase of the voltage $U_1$ is adjustable in such a range, that the positive impulses appear at any arbitrary phase of the intervals $180° \leqslant a_2 \leqslant 270°$. The firmly installed phase changing circuit which is symbolized in the figure by a condenser and a rheostat will be described further. A constant negative initial grid voltage $U_g$ is normally situated at the control grid of the thyratron $V_2$ in order that the latter can be ignited by the positive impulses. This grid voltage is connected in series with the impulse voltage $U_2$ and its magnitude is to correspond to the impulse amplitude. The direct current voltage $U_g$ is produced from the alternating current $U_0$ originating in the phase shifter $D_2$ via the rectifier $G_1$ and the transformer $T_2$.

Now will be discussed the production of voltage for the supplementary ignition of the thyratron $V_2$ at the phase $a_4$. According to the above-mentioned relations this ignition must be effected at the moment when (like Fig. 3)

$$U_i = \frac{U_{v'} + U_{n''}}{2} \text{ or } 2U_i - U_{n''} - U_{v'} = 0$$

According to Fig. 5 a voltage $U_3$ is taken from the rheostat $R_2$ of the potentiometers $R_1$, $R$, $R_2$ which is proportional to the voltage difference $U_i - U_{n''}$, takes a course $U_3 = p \cdot (U_i - U_{n''})$. To the latter voltage a voltage $U_{i'}$ proportional to the voltage $U_i$ is added which originates in the transformer $T_3$ vis: $U_{i'} = p \cdot U_i$. The primary winding of this transformer is supplied from the same phase of the three-phase current net as the exciter coil P of the betatron. Finally a voltage $p \cdot U_{v'}$ proportional to the voltage $U_{v'}$ must be deducted from the sum of $U_3 + U_i = p \cdot (2U_i - U_{n''})$. This is a direct current voltage $U_4$, whose magnitude depends on the phase $a_1$ arranged by the phase shifter $D_1$ according to the condition $U_4 = p \cdot U_i \cdot \sqrt{2} \cdot \sin(a_1 + \pi/4)$ as derived above. Such a direct current voltage is acquired from the alternating current voltage $U_5$ supplied by the phase shifter $D_1$ via the rectifier $G_2$ and the transformer $T_4$, provided that $U_5$ is the geometric total of the voltage on the movable secondary winding of the phase shifter and the voltage of the phase S—O. This is the case of the outlined series connection of the secondary winding $d_2$ with the winding $d_1$, when the voltage supplied by the secondary winding shows the same amplitude as the voltage on the primary winding $d_1$. To enable a turn of the phase of the voltage $U_5$ in a range of $\delta = 90°$, the secondary winding must be adjustable within a range of $2\delta = 180°$. The alternating current voltage $U_5$ supplied by the phase shifter $D_1$ serves simultaneously as the producer of the expansion impulse for the thyratron $V_1$ by means of the devices contained in the block I. On the other hand the alternating voltage $U_0$ in the block I supplied by the phase shifter $D_2$ is converted into the direct current voltage required for the production of the supplementary impulse for the thyratron $V_1$. The fact that the amplitudes of the voltages $U_0$, resp. $U_5$ are adjustable at the shifting of the phase shifter is practicaly insignificant for the production of the expansion impulses when it is considered that impulse voltage $U_2$ and initial grid voltage $U_g$ are changing to the same extent. However, it must be taken into account that then, when for example the voltage $U_0$ shows its maximum amplitude, its phase is shifted by 30° against the phase S—T, which feeds the betatron. Fig. 3 (see the dashed line) demonstrates that the maximum amplitude of the voltage $U_0$ should appear at the phase $a = 45°$. Therefore, the fixed installed phase shift unit F is provided for, which produces the proper mutual relation between the phase of the impulse voltage $U_2$ and the magnitude of the direct current voltage $U_4$.

Thus the voltage at the point N reaches the zero value, when the supplementary ignition of the thyratron $V_2$ should take place. However, a detailed investigation reveals that the voltage at the point N can again reach the zero value in the interval $0° \leq \alpha \leq 180°$. An intermittent direct-current voltage is produced in the rheostat $R_3$ through the rectifier $G_3$ and the transformer $T_5$, so that no ignition can take place at that moment. The intermittent voltage consists of negative sine half-waves which appear in the said intervals. To achieve this, the primary winding of the transformer $T_5$ is supplied by a voltage, whose phase is shifted by 90° against those of the voltage $U_1$, thus from the lines R and O of the alternating current net. In order that, at the moment of the supplementary ignition the control grid of the thyratron $V_2$ obtain the zero potential despite the initial grid voltage $U_g$, a positive direct current voltage $U_{g'}$ is added to the voltage at the point N. This is acquired from the alternating voltage $U_0$ supplied by the phase shifter $D_2$ through the rectifier $G_4$ and the transformer $T_2$; its magnitude changes, therefore, at the adjustment of the phase $\alpha_2$ in the same measure as the magnitude of the initial grid voltage $U_g$.

Finally there is still in effect the rheostat $R_4$ in conjunction with the rectifier $G_5$. This rectifier connects the point M with the point B, as soon as the voltage—which is produced in the parts drafted on the left from the rectifier—becomes negative against the point B. This is the case especialy within the range $180° \leq \alpha \leq 270°$, where appears the expansion impulse of the thyratron $V_2$. In this range there also is situated, as mentioned above, the point M on the cathode of the thyratron $V_2$ and only there are effective the initial grid voltage $U_g$ and the impulse voltage $U_2$ on the control grid of the thyratron $V_2$. The rheostat $R_4$ impedes a too great load of the voltage sources during the periods when the rectifier $G_5$ supplies current.

It has been proved successful in practice that the parts contained in the dotted rectangle of the block II and the relative parts of the block I, have been surrounded in each case by a screening box, which was conductively connected with the cathode of the associated thyratron. In this way a regular operation is ensured despite the great potential fluctuations which appear during the recharging of the condenser C.

We claim:

1. A magnetic induction accelerator comprising an evacuated chamber within which charged particles such as electrons may follow a closed orbital path, means including an exciter coil and an associated magnetic circuit adjacent said chamber for producing a cyclically varying magnetic field of alternating polarity, said field having such spatial distribution as to normally confine the electrons to said orbital path while continuously accelerating them along said path, means including electron emissive cathode means operated in timed relation with the variation in said magnetic field for periodically injecting electron streams into said chamber for acceleration respectively in opposite directions along said path, the direction of acceleration of a particular stream being dependent upon the polarity of said magnetic field, an auxiliary winding encompassing at least a part of said alternating magnetic field for removing the accelerated streams of electrons from their orbit by expansion or contraction of each said accelerated electron stream, said auxiliary winding being connected in series circuit with a condenser and two parallel arranged grid-controlled thyratron tubes connected in back-to-front relation, means for effecting a primary ignition of each of said thyratron tubes in each half respectively of the cycle of said alternating magnetic field thereby to energize said auxiliary winding from said condenser to effect removal of the corresponding accelerated electron stream from the orbit, and means for effecting a supplementary ignition of each said thyratron tube following the principal ignition thereof and prior to acceleration of the next stream of electrons in the opposite direction thereby to periodically recharge said condenser.

2. A magnetic induction accelerator as defined in claim 1 for accelerating charged particles wherein said means for respectively effecting the primary and supplementary ignitions of said thyratron tubes include control voltages in the grid circuits of said tubes, said control voltages being constituted by the output voltages of adjustable phase shifter means connected to said source of alternating current.

3. A magnetic induction accelerator as defined in claim 1 for accelerating charged particles wherein said means for effecting the primary ignition of each said thyratron tube includes a phase shifting device connected to said source of alternating current and wherein said means for effecting the supplementary ignition of each said thyratron tube includes a phase shifting device connected to said source of alternating current, and wherein all four of said phase shifting devices are individually adjustable, the output voltages of said phase shifting devices being connected in the grid circuits of said tubes.

4. A magnetic induction accelerator as defined in claim 1 for accelerating charged particles wherein said means for effecting the primary ignition of each said thyratron tube includes a first pair of phase shifting devices connected to said source of alternating current and wherein said means for effecting the supplementary ignition of each said thyratron tube includes a second pair of phase shifting devices connected to said source of alternating current, said first pair of phase shifting devices being individually adjustable and the phase shifting devices constituting said second pair being respectively mechanically coupled to the phase shifting devices constituting said first pair so as to be automatically adjusted as the latter are adjusted, the output voltages of said phase shifting devices being connected in the grid circuits of said tubes.

5. A magnetic induction accelerator as defined in claim 1 for accelerating charged particles wherein said supplementary ignition of each said thyratron tube is effected when the voltage induced by said alternating magnetic field in said auxiliary winding lies intermediate the voltage on said condenser existing from the previous removal of a stream of electrons accelerated in one direction around the orbit and the voltage required for removal of the next stream of electrons accelerated in the opposite direction around the orbit.

References Cited in the file of this patent
UNITED STATES PATENTS

| | | |
|---|---|---|
| 2,099,715 | Young | Nov. 23, 1937 |
| 2,564,347 | Solomon | Aug. 14, 1951 |
| 2,666,887 | Rockafellow | Jan. 19, 1954 |